United States Patent [19]

Hoogendoorn et al.

[11] Patent Number: 5,083,224
[45] Date of Patent: Jan. 21, 1992

[54] APPARATUS FOR RECORDING AN AUDIO SIGNAL WITH PROTECTION AGAINST RE-RECORDING THEREOF, AND RECORDING APPARATUS WHICH INDICATES THE PRESENCE OF SUCH PROTECTION

[75] Inventors: Abraham Hoogendoorn; Gerardus Lokhoff, both of Eindhoven, Netherlands

[73] Assignee: U.S. Philips Corporation, New York, N.Y.

[21] Appl. No.: 495,017

[22] Filed: Mar. 15, 1990

[30] Foreign Application Priority Data

Apr. 14, 1989 [NL] Netherlands ................ 8900934

[51] Int. Cl.⁵ .............................. G11B 5/09
[52] U.S. Cl. .............................. 360/60
[58] Field of Search .................. 360/60; 380/4

[56] References Cited

U.S. PATENT DOCUMENTS 4,963,998  10/1990  Maute ........................ 360/60

FOREIGN PATENT DOCUMENTS 298691  1/1989  European Pat. Off. .

Primary Examiner—Vincent P. Canney
Attorney, Agent, or Firm—Leroy Eason

[57] ABSTRACT

Low-frequency components of the left and right channels of the audio signal to be recorded are derived by means of filters (3, 4). First and second auxiliary signals are added to such low-frequency components in such a way that during reproduction of the audio signal so recorded, including the first and the second auxiliary signals added thereto, by means of two loudspeaker units arranged in a stereo configuration, the two auxiliary signals are not audible. However, they will inhibit re-recording by apparatus for recording audio signals which are not copy-protected in the form of the aforesaid two auxiliary signals, or will cause such apparatus to indicate that the audio signal to be re-recorded is protected.

23 Claims, 5 Drawing Sheets

APPARATUS FOR RECORDING AN AUDIO SIGNAL WITH PROTECTION AGAINST RE-RECORDING THEREOF, AND RECORDING APPARATUS WHICH INDICATES THE PRESENCE OF SUCH PROTECTION

BACKGROUND OF THE INVENTION

1. Field of the Invention

The invention relates to an arrangement for recording on a record carrier an audio signal comprising a left-hand and a right-hand channel, which arrangement has a first and a second input terminal for receiving the left-hand and the right-hand channel respectively, said first and said second input terminal being coupled respectively to a first and a second input of the recording unit to record the signals applied to its inputs on the record carrier.

The invention also relates to a record carrier on which an audio signal has been recorded by means of the arrangment in accordance with the invention.

2. Description of Related Art

Arrangements of the type defined in the opening paragraph are known in the form of magnetic tape recorders, for example RDAT or SDAT recorders. In both cases the audio signal is digitised and is subsequently recorded on the magnetic tape. For this purpose an RDAT recorder employs a rotating head and the audio signals are recorded on the record carrier in adjacent tracks which are inclined relative to the longitudinal direction of the record carrier. In an SDAT recorder the digitised and encoded audio signal is divided among a plurality of stationary heads and is recorded on the record carrier in an equal number of tracks which extend in the longitudinal direction of the record carrier.

For a comprehensive description of the two above systems reference is made to the book "The art of digital audio" by J. Watkinson, Focal press, London, 1988.

One of the reasons why the systems have not yet found acceptance on the market is the problem of unauthorized copying. For this reason suppliers of prerecorded record carriers are not willing to supply such record carriers for use in one of the said systems.

Digital copying, i.e. direct copying of the digitised and encoded audio signal without prior D/A conversion and subsequent A/D conversion, hardly leads to a degradation in quality in said systems. Therefore, it is envisaged that digital copying will assume large proportions, resulting in a substantial loss of royalties.

In the past proposals have been made to inhibit digital copying. These proposals are based on the insertion of a copy-protection code in the subcode of the digital data stream as recorded on the record carrier.

Copying is inhibited upon detection of the copy-protection code in the subcode. The advantage of this method is that the audio signal is not disturbed because the protection code is not inserted in the audio signal itself.

Copying prerecorded record carriers via the analog path, i.e. the audio signal to be reproduced is first D/A converted in the reproducing apparatus and is subsequently applied to the recording apparatus in analog form, where it is re-digitised prior to recording, cannot be preluded in this way.

Since this (analog) method of copying prerecorded record carriers by means of the above systems neither leads to any substantial deterioration in quality it is also envisaged that analog copying will be used on a large scale.

Proposals to inhibit copying by analog methods have also been made in the past. For example, there has been a proposal by CBS to feed the audio signal through a very narrow-banded band-stop filter prior to recording of the signal on the record carrier. If during subsequent re-recording of an already recorded audio signal it is detected that there is no signal content in the relevant frequency range, the signal apparently concerns copy-protected information and recording is interrupted or the audio signal to be recorded is disturbed.

A drawback of this method is that the audio signal is distorted because it is fed through the band-stop filter. This distortion is sometimes audible, which is very annoying.

SUMMARY OF THE INVENTION

It is an object of the invention to propose steps enabling unauthorized copying of (prerecorded) record carriers by analog methods to be inhibited or to be signalled.

To this end one type of recording arrangement in accordance with the invention is characterized in that the first and the second input terminals thereof are coupled to an input of a first and a second filter device respectively, which devices are adapted to extract a first and a second low-frequency signal component from the left-hand and the right-hand channel respectively and to apply the first and the second low-frequency signal component to an output. The output of the first filter device is coupled to an input of a first signal-processing unit and the output of the second filter device is coupled to an input of the second signal-processing unit, and the outputs of the first and the second signal-processing unit are coupled to the first input and the second input respectively of the recording unit. The first signal-processing unit is adapted to add a first auxiliary signal to the signal applied to its input and to supply the signal thus processed to its output, and the second signal-processing unit is adapted to add a second auxiliary signal to the signal applied to its input and to supply the signal thus processed to its output. The first and the second auxiliary signals are selected in such a way that during reproduction of the audio signal, including the first and the second auxiliary signal added thereto, via two loudspeaker units arranged in a stereo configuration, the auxiliary signals are substantially inaudible to a listener.

This arrangement is intended for the production of prerecorded cassettes provided with a copy-protection code, and will generally be employed in the software industry. Another recording arrangement of the type defined in the opening paragraph is characterized in that the first and the second input terminals are coupled to an input of a first and a second filter device respectively, the first and the second filter device being adapted to extract a first and a second low frequency signal component respectively from the left-hand and the right-hand channel respectively and to supply the first and the second low-frequency signal component to an output. The output of at least one of the two filter devices is coupled to an input of a detector unit, which is constructed to detect the presence of an auxiliary signal in the low-frequency signal component of at least one of the two signal channels, to generate a control signal upon detection of the auxiliary signal, and to supply the control signal to an output. The output of the detector unit is coupled to a control-signal input of the recording unit, and the recording unit is adapted to inhibit recording in the presence of the control signal and to record the audio signal in the absence of the control signal.

This arrangement is intended to inhibit copying of an audio signal which is protected against copying or to seriously distort this signal prior to recording. Such arrangements will be utilised, in particular, in consumer equipment.

The invention is based on the recognition of the fact that analog copying can be prevented by means of a copy-protection code inserted in the audio signal without the protection code having an adverse effect on the audio signal. For this purpose a first and a second auxiliary signal are inserted respectively in a low-frequency signal component of the left-hand channel and the right hand channel of the audio signal. This low-frequency signal component is preferably the audio signal situated in a frequency range below 150 to 200 Hz. In this frequency range the audio signal contains hardly any stereo information and the audio signal is quite redundant. This enables the first and the second auxiliary signal to be inserted in such a way that these auxiliary signals, although they are present in the audio signal, are not audible during reproduction.

If an audio signal which is thus protected is to be recorded by means of an arrangement intended for the consumer market, it is possible to detect in the arrangement whether auxiliary signals have been added to the audio signal. If this is the case, recording is discontinued or the audio signal to be recorded is distorted. Detection of the auxiliary signals is possible by detecting one of the auxiliary signals or by using the presence of both auxiliary signals.

Yet another arrangement of the type defined in the opening paragraph is characterized in that the first and the second input terminal are coupled to an input of a first and a second filter device respectively, which are adapted to extract a first and a second low-frequency signal component from the left-hand and the right-hand channel respectively and to supply the first and the second low-frequency signal component to an output. The output of at least one of the two filter devices is coupled to an input of a detector unit which detects the presence of an auxiliary signal in the low-frequency signal component of at least one of the two channels, and is adapted to generate a control signal upon detection of the auxiliary signal and to supply the control signal to an output. The output of the detector unit is coupled to a signalling unit, which is adapted to indicate that in the presence of the control signal the audio signal to be recorded is an audio signal provided with the auxiliary signal. This arrangement can also be employed as a consumer apparatus and does not serve inhibit copying of copy-protected information but serves, merely to detect and signal that the relevant information is protected and should not be copied.

The arrangement intended for the consumer market may be characterized further in that the output of the first filter device is coupled to an input of a first signal-processing unit, the output of the second filter device being coupled to an input of a second signal-processing unit. The outputs of the first and the second signal-processing unit are coupled to the first and the second input of the recording unit, the first signal-processing unit being adapted to add a first auxiliary signal to the signal applied to its input and to supply the signal thus processed to its output, and the second signal-processing unit being adapted to add a second auxiliary signal to the signal applied to its input and to supply the signal thus processed to its output. The arrangement is adapted to optionally add in the absence of the control signal the first and the second auxiliary signal to the audio signal applied to its input terminals and to supply the audio signal, thus processed or not, to the inputs of the recording unit. The first and the second auxiliary signals are selected in such a way that during reproduction of the audio signal, including the first and the second auxiliary signals added thereto, via two loudspeaker units arranged in a stereo configuration, the auxiliary signals are substantially inaudible to a listener.

In this way the consumer can make his own recordings on cassettes which, if desired, can be protected against copying. The first and the second auxiliary signal can be added directly to the low-frequency signal component of the left-hand and the right-hand channel respectively. Instead of this, the arrangement intended for the consumer market may be characterized in that the output of the first filter device is coupled to an input of a first signal processing unit, the output of the second filter device is coupled to an input of a second signal processing unit, and the outputs of the first and the second signal processing units are coupled to the first and the second inputs of the recording unit. The first signal-processing unit is adapted to add a first auxiliary signal to the signal applied to its input and to supply the signal thus processed to its output, and the second signal-processing unit is adapted to add a second auxiliary signal to the signal applied to its input and to supply the signal thus processed to its output, and the device is adapted to add, in the absence of the control signal, the first and the second auxiliary signal to the audio signal applied to its input terminals and to supply the audio signal thus processed to the inputs of the recording unit. The first and the second auxiliary signals are selected in such a way that during reproduction of the audio signal, including the first and the second auxiliary signal added thereto, via two loudspeaker units arranged in a stereo configuration, said auxiliary signals are substantially inaudible to a listener. In this case there is no option in all cases the auxiliary signals being added to an audio signal to be recorded which does not yet contain the auxiliary signals. This provides a solution enabling original recordings (not provided with the auxiliary signals) or prerecorded tapes (which also are not provided with the auxiliary signals) to be copied but preventing copies from being copied again.

Moreover, all the arrangements described so far may be characterized further in that the outputs of the first and the second filter device are coupled to a first and a second input of the signal combination unit, which has an output coupled to the inputs of the two signal-processing units. In this case the low-frequency signal components of the left-hand and the right-hand channel are in fact made equal to one another. Now monophonic signals are generated in both channels in the low frequency range below 50 to 200 Hz, to which subsequently the first and the second auxiliary signal are added. An advantage of this is that detection of the copy-protection code in a consumer apparatus can be simpler and more reliable.

The auxiliary signals can be added to the audio signals in various ways. For example, in a first embodiment the first signal-processing unit is adapted to amplify the signal applied to its input, in cycles of each time two successive time intervals $T_1$ and $T_2$, by values $1+a$ and $1-a$ respectively and the second signal processing unit is adapted to amplify the signal applied to its input, in cycles of similar time intervals $T_1$ and $T_2$, by values substantially equal to $1-a$ and $1+a$ respectively, a being a constant smaller than 1. In a second embodiment the first signal-processing unit is adapted to amplify the signal applied to its input, in cycles of each time two successive time intervals $T_1$ and $T_2$, by values $1+a$ and $1-a$ respectively and the second signal processing unit is adapted to amplify the signal applied to its input, in cycles of similar time intervals $T_1$ and $T_2$, by values substantially equal to $1-a$ and $1+a$ respectively, a being a constant smaller than 1. Moreover, the signal processing units may be further adapted to add and subsequently not to add the auxiliary signal to the signals applied to their outputs in cycles of each time two consecutive time intervals $T_A$ and $T_B$. In all these cases use is made of the knowledge about the perceptual properties of hearing, and it is found that additional information may be added to the audio signal without this additional information being perceptible to a listener.

The arrangement may be characterized further in that the first input terminal is further coupled to a third filter device and the second input terminal is coupled to a fourth filter device, the third and the fourth filter device being adapted to extract a second higher-frequency signal component from the left-hand and the right-hand channel respectively. An output of the third and the fourth filter device is coupled respectively to a third and a fourth input of the recording unit to record the signal components of higher frequency of the left-hand and the right-hand channel on the record carrier.

This embodiment suitably employs an encoder for subband coding as described inter alia in the Applicant's European Patent Application 289,080. The digital filters in the analysis filter means, which are present anyway in a subband encoder, enables a sharp isolation to be obtained between the signal components in the various subbands. Therefore, no additional filters are required.

BRIEF DESCRIPTION OF THE DRAWINGS

Embodiments of the invention will now be described in more detail, by way of example, with reference to the accompanying drawings. In the drawings

DESCRIPTION OF THE PREFERRED EMBODIMENTS

Figure 1:
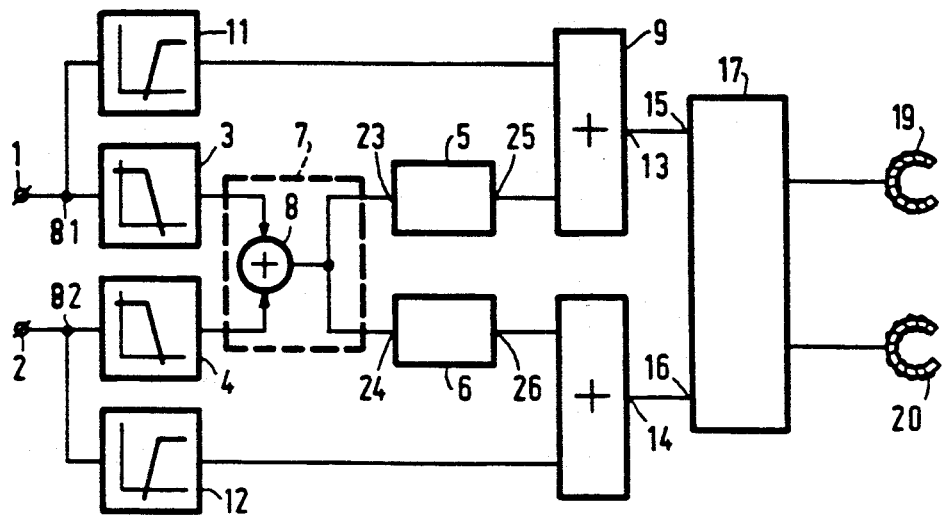
FIG. 1 shows a first embodiment of an arrangement for manufacturing a copy-protected record carrier, FIG. 1a showing an RDAT as such a record carrier.

FIG. 1 shows an arrangement comprising a first input terminal 1 and a second input terminal 2 for the left-hand and the right-hand channel respectively of an audio signal. The input terminals are coupled to a first filter device 3 and a second filter device 4 respectively. The filter devices 3 and 4 are constructed to extract a first and a second low frequency signal component from the left-hand and the right-hand channel respectively. The filter devices may be constructed for example as two low-pass filters having cut-off frequencies in a range of for example 150 Hz to 200 Hz. The output of the filter device 3 is coupled to an input of a first signal-processing unit 5. The output of the filter device 4 is coupled to an input of a second signal-processing unit 6. These couplings may be direct couplings. FIG. 1 shows a coupling via the circuit 7, comprising a signal-combination unit 8. The outputs of the filter devices 3 and 4 are now coupled to two inputs of the signal-combination unit 8. The output of the combination unit 8 is coupled to the inputs of the two signal-processing units 5 and 6. The signal combination unit 8 may be an adder which, for example, divides the signals applied to its inputs by two and subsequently adds them to each other.

The signal-processing units 5 and 6 are adapted to add a first and a second auxiliary signal to the signals applied to their respective inputs and to supply the signals thus processed on their outputs.

Outputs of the signal-processing units 5 and 6 are coupled to inputs of the signal-combination units 9 and 10 respectively. The input terminals 1 and 2 are also coupled to inputs of the signal-combination units 9 and 10 respectively via the filter devices 11 and 12 respectively. The filter devices 11 and 12 extract a high-frequency signal component from the left-hand and the right-hand channel in a frequency range which is complementary to the frequency range in which the low-frequency signal components are situated. Therefore, the filter devices take the form of high-pass filters having a cut-off frequency substantially corresponding to the cut-off frequency of the low-pass filters in the filter devices 3 and 4. The combination units 9 and 10 are intended to recombine the associated low-frequency and high-frequency signal components. Thus, as far as the high frequency range is concerned, the original stereo signal, is again available on the outputs 13 and 14 of the combination units 9 and 10 respectively. With respect to the low frequency range the same (monophonic) signal is available on the two outputs. The first auxiliary signal is added to the one signal and the second auxiliary signal is added to the other signal.

Figure 1A:
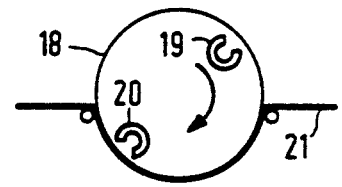

The outputs 13 and 14 are coupled to inputs 15 and 16 respectively of a recording unit 17. In the present case this is a recording unit of an RDAT recorder, which records the audio signal thus processed on a record carrier 21 as shown in FIG. 1a by means of two recording heads 19 and 20 arranged on a rotatable head drum 18. The method of recording an audio signal on a record carrier by means of an RDAT recorder is described comprehensively in the literature, see inter alia the aforementioned book by Watkinson, and requires no further explanation. This is particularly so because the invention does not relate to the specific method of recording the audio signal on a record carrier.

Since an RDAT recorder records the signal digitally and in encoded form on the record carrier the arrangement should comprise A/D converters. These (two) A/D converters may be arranged, for example, in the connection between the terminals 1 and 2 and the junction points 81 and 82 respectively. All the operations are then performed on digital signals, which means that all elements such as for example the filters 3, 4, 11 and 12 are, will be digital elements (filters).

Another possibility is not to digitise the signals until after the outputs 13 and 14. In that case the operations are performed on analog signals.

The operation and the purpose of the signal-processing units 5 and 6 will now be described in more detail. The signal-processing units 5 and 6 are adapted to insert the first and the second auxiliary signal, the auxiliary signals being selected in such a way that these auxiliary signals are not audible to a listener during reproduction of the audio signal by means of two loudspeaker units arranged in a stereo configuration.

Figure 2:
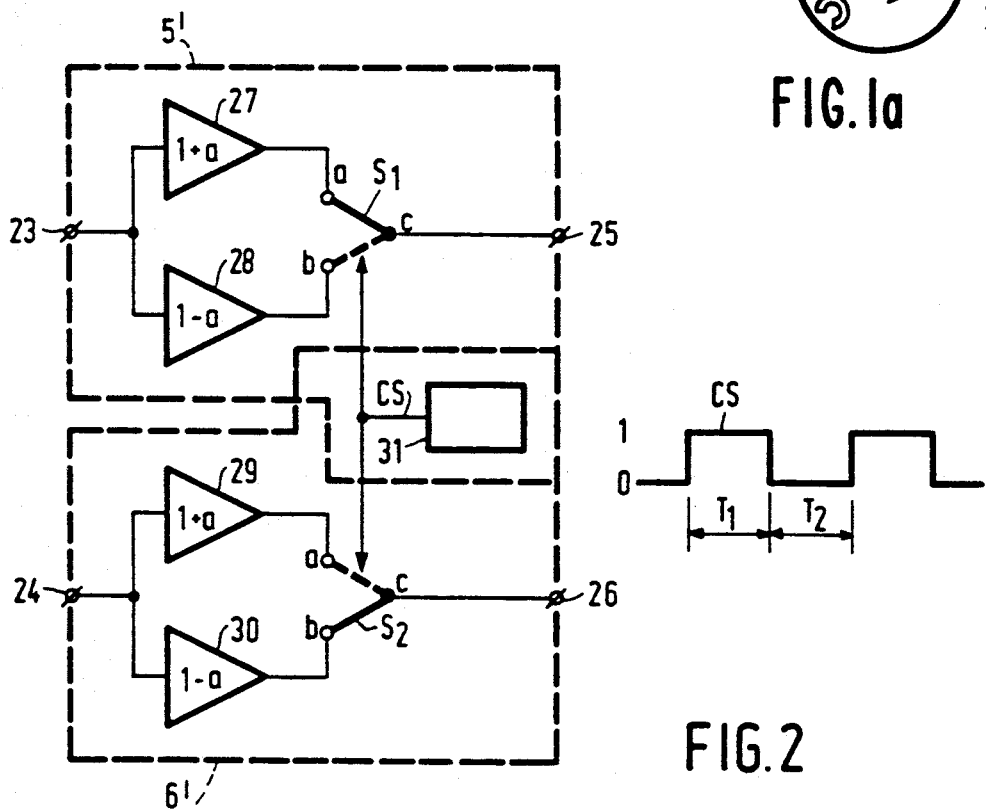
FIG. 2 shows a first example, FIG. 2a being the waveform of signal CS therein.

FIG. 2 shows a first example of the signal-processing units 5 and 6. In this figure the processing units bear the reference numerals 5' and 6'. The input 23 of the processing unit 5' is coupled to inputs of amplifiers 27 and 28. The outputs of these amplifiers 27 and 28 are coupled to the terminals a and b respectively of a switch $S_1$. The third terminal c of this switch is coupled to the output 25 of the processing unit 5'.

The signal-processing unit 6' is of a similar construction. Moreover, the units 5' and 6' have a squarewave generator 31 in common. This generator 31 supplies a squarewave cs, which as shown in FIG. 2a is "high" or logic "1" and which is "low" or logic "0" during cycles of two consecutive time intervals $T_1$ and $T_2$ respectively. The squarewave cs is applied to the two switches $S_1$ and $S_2$ as a control signal in such a way that if the squarewave cs is "high", the switches are in the position shown and if the squarewave is "low" the switches are in the other position.

The amplifiers 27 and 29 amplify the signal applied to their input by a factor of $1+a$, where a is a constant which is smaller than 1. The amplifiers 28 and 30 amplify the signals applied to their inputs by a factor of $1-a$.

Consequently, in turn, the left-hand channel is amplified by a factor of $1+a$ and the right-hand channel by a factor of $1-a$ in the time interval $T_{21}$ and the left-hand channel is amplified by a factor of $1-a$ and the right-hand channel by a factor of $1+a$ in the time interval $T_2$.

Figure 3:
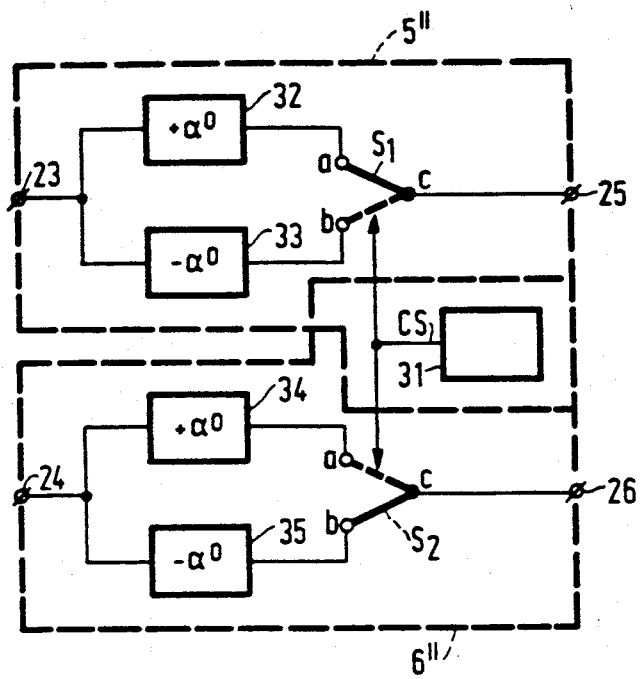
FIG. 3 shows a second example.

FIG. 3 shows diagrammatically a second example of the signal-processing units 5 and 6. In this Figure the processing units bear the reference numerals 5" and 6". The circuit bears much resemblance to the circuit shown in FIG. 2. The difference is that the amplifiers 27 to 30 in FIG. 2 are replaced by phase shifters 32 to 35. The phase shifters 32 and 34 each advance the phase of their input signal by a phase angle of $a^\circ$ and the phase shifters 33 and 35 retard the phase of their input signals by a phase angle of $a^\circ$. The value of $a$ may be, for example, 45°. On the one hand, $a$ should not be too small in order to guarantee a correct detection of the auxiliary signals (see hereinafter) and, on the other hand, it should not be too large in order to prevent the audio signal being attenuated excessively. If the phase shift is to be made larger in spite of this, a corresponding amplitude correction should be applied to the phase-shifted signals. The control system for the switches $S_1$ and $S_2$ by means of the squarewave generator 31 operates in the same way as that of the switches $S_1$ and $S_2$ in the circuit shown in FIG. 2.

It is not necessary to switch the signals each time from a phase shift of $+a^\circ$ to a phase shift of $-a^\circ$. It is also possible to give the low-frequency signal component of the left-hand channel constantly a phase shift of $+a^\circ$ and to give the low-frequency system component of the right-hand channel constantly a phase shift of $-a^\circ$. In that case the elements 33, 34, 31 may be dispensed with and the switches $S_1$ and $S_2$ are replaced by connections to the outputs 25 and 26. One possibility is to construct the element 32 as a delay line which provides a phase shift of the signal through $2a^\circ$. No phase shifter is then arranged in the connection from the input 24 to the output 26. The delay lines which shift the signal through $a^\circ$ should then be arranged in the connection from the filters 11 and 12 to the combination units 9 and 10 respectively.

Figure 4:
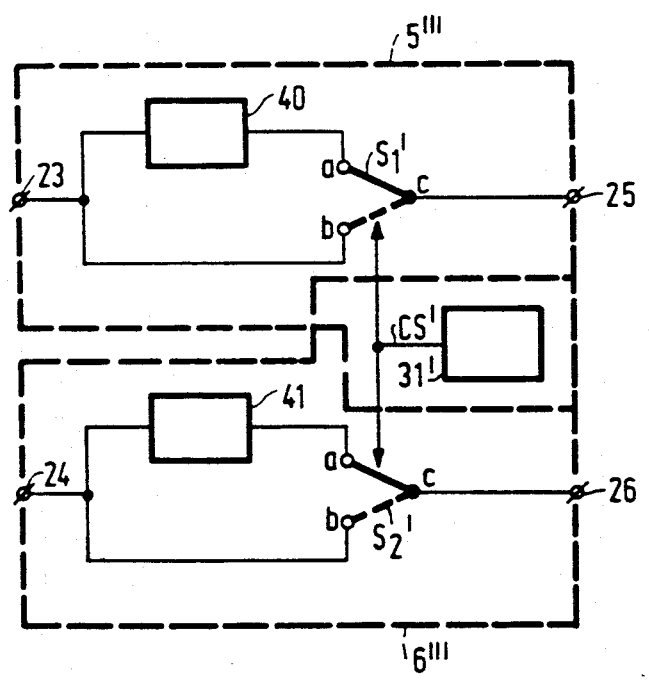
FIG. 4 shows a third example, FIG. 2b being the waveform of signal CS' therein.
Figure 4A:
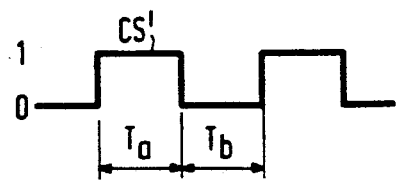

FIG. 4 shows a third example of the signal-processing units 5 and 6. In this Figure the processing units bear the reference numeral 5''' and 6'''. The input 23 is coupled to the terminal d of a switch $S'_1$ via the unit 40. The input 23 is coupled directly to the terminal b of this switch. The terminal c of the switch $S'_1$ is coupled to the output 25. Similarly, the input 24 is coupled to the terminal a of the switch $S'_1$ via the unit 41 and is coupled directly to the terminal b of this switch. The terminal c of the switch $S'_2$ is coupled to the output 26. The switches are controlled by a control signal cs', which is generated by a squarewave generator 31' which is common to the two signal-processing units 5''' and 6'''. The squarewave generator 31' generates a squarewave cs' which is "high" or logic "1" and "low" or logic "0" during cycles of each time two successive time intervals $T_a$ and $T_b$ respectively. If the squarewave cs' is high the switches $S'_1$ and $S'_2$ are in the position shown. If the squarewave is low the switches will be in the other position.

Either the units 27 and 29 or the units 32 and 34, as described with reference to FIGS. 2 and 3 may be used for the units bearing the reference numerals 40 and 41.

The signal-processing units 5''' and 6''' operate as follows: during cycles of each time two successive time intervals $T_a$ and $T_b$ the auxiliary signals are alternately added and not added to the signals applied to the outputs 25 and 26 respectively.

Figure 5:
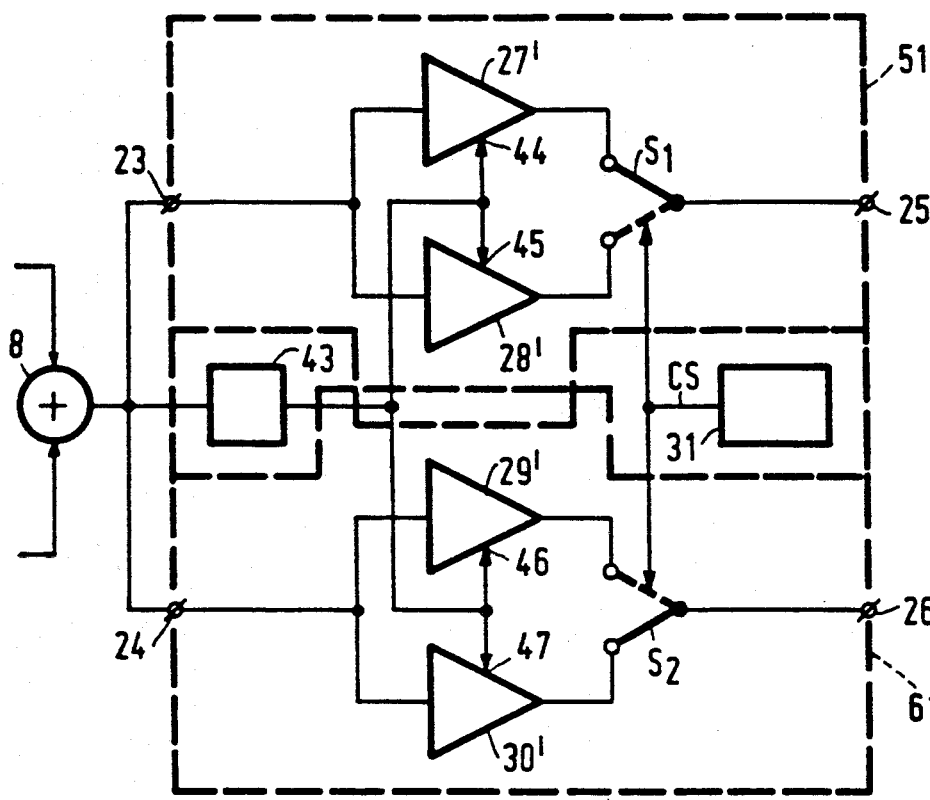
FIG. 5 shows a fourth example of the signal processing units in the arrangement shown in FIG. 1.

FIG. 5 shows yet another example of the signal-processing units 5 and 6, which now bear the reference numerals 51 and 61 respectively. The units 51 and 61 bear much resemblance to the units 5' and 6' in FIG. 2. The amplifiers 27 to 30 in FIG. 2 now bear the reference numerals 27' to +'. The amplifiers 27' to 30' are amplifiers having variable gain factors. The amplifier 27' has a gain factor of $V(A)(1+a)$, the amplifier 28' has a gain factor of $V(A)(1-a)$, the amplifier 29' has a gain factor of $V(A)(1+a)$, and the amplifier 30' has a gain factor of $V(A)(1-a)$. The factor $V(A)$ is a gain factor V which depends on the amplitude A of the input signals applied to the inputs 23 and 24. For this purpose the amplifiers 27' to 30' each have a control-signal input 44, 45, 46 and 47 respectively. Moreover, there is provided an amplitude detection unit 43 which is common to the processing units 51 and 61 and which has an input coupled to the output of the signal-combination unit 8 and which has an output coupled to the control signal inputs 44 to 47.

The amplitude detection unit 43 is constructed to detect the amplitude A of the output signal of the combination unit 8. The "amplitude of the output signal" may be understood to mean: the signal value averaged over a specific time internal. Another possibility is to define the signal amplitude as the energy content of the signal.

The detection on the amplitude of the input signal. Depending on this control signal the gain factor V(A) varies and hence the gain factors of the four amplifiers 27' to 30' vary, in such a way that if the amplitude A decreases or increases as a function of time the gain factor V(A) decreases and increases respectively.

Figure 6:
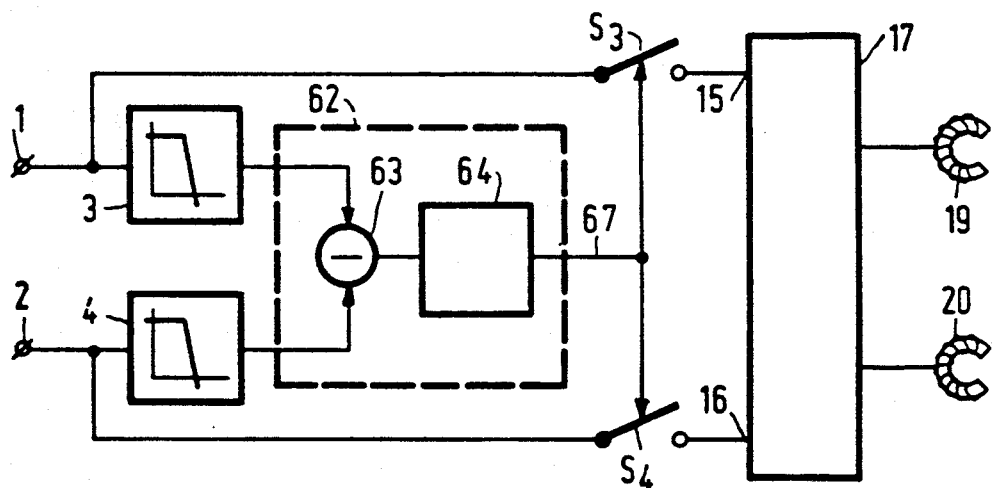
FIG. 6 shows an embodiment of an arrangement intended for the consumer market.

FIG. 6 shows an arrangement in accordance with the invention intended for the consumer market.

The arrangement is intended to enable audio information which is not provided with a copy-protection code to be recorded normally on a record carrier, the arrangement comprising a detector unit to detect a copy-protection code which may have been inserted in the audio signal in order to inhibit recording of this audio signal.

For this purpose the arrangement comprises a first filter device 3 coupled to an input terminal 1 and a second filter device 4 coupled to an input terminal 2. The left-hand and right-hand channels of the audio signal, which may contain a copy-protection code in the form of first and second auxiliary signals as added to the audio signal by the device shown in FIG. 1, are applied to the terminals 1 and 2. The filter devices 3 and 4 are again low-pass filters having a cut-off frequency between, for example, 150 and 200 Hz.

The outputs of the filter devices 3 and 4 are coupled to associated inputs of a deterctor unit 62. The detector unit 62 is adapted to detect at least one of the auxiliary signals (if present) in the output signals of the filter devices 3 and 4. A reliable detection can be realised by first subtracting the output signals of the filter devices 3 and 4 from one another. For this purpose the detector unit 62 comprises a signal-combination unit 63, which substrates the two signals applied to its inputs from each other. The output signal of the combination unit 63 no longer contains the monophonic audio signal. If the audio signals applied to the inputs 1 and 2 contain a copy-protection code only the two auxiliary signals are still present. Thus, the detector 64, which is coupled to the output of the combination unit 63, enables the presence or absence of one or both auxiliary signals to be detected very accurately.

Figure 7:
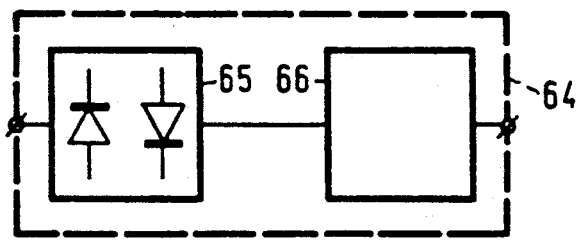
FIG. 7 shows an example of a detector used in the arrangement shown in FIG. 6.

If the auxiliary signals have been added to the audio signal by means of the signal-processing units 5' and 6' in FIG. 2 the detector 64 may comprise, for example, a rectifier 65, which rectifies the input signal of the detector 64 and feeds the rectified input signal to a threshold deterctor 66, see FIG. 7. If the input signal of the threshold detector 66 exceeds a specific threshold value the threshold detector 66 generates and output signal, which in order to control two switches $S_3$ and $S_4$ arranged in the connections between the input terminals 1 and 2 and between the inputs 15 and 16 respectively of the recording device 17 is applied via the line 67.

If auxiliary signals are present in both signal components of the audio signal applied to the terminals 1 and 2, the control signal will be applied to the line 67. If the control signal is present the switches $S_3$ and $S_4$ are controlled in such a way that they are in the open position. This means that the applied audio signal is not recorded by the device.

In the absence of the auxiliary signals no control signal will be generated and the switches $S_3$ and $S_4$ will be in the closed positions. The applied audio signal can then be recorded.

If the auxiliary signals have been added to the audio signal in a different way the detector unit 62 should sometimes be of a different construction.

Instead of interrupting the audio signals by means of the switches $S_3$ and $S_4$ if the auxiliary signals are present it is possible to replace the switches by units which seriously distort the audio signal under the influence of the control signal.

Figure 8:
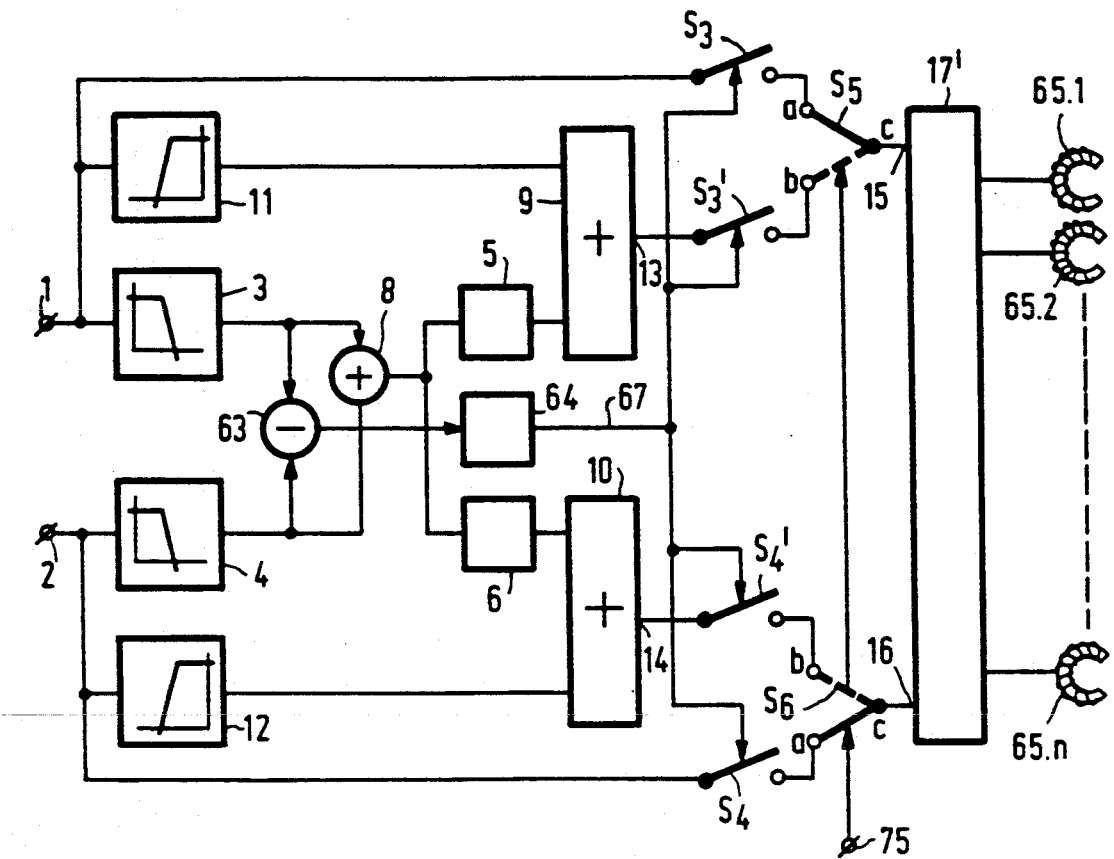
FIG. 8 shows a further embodiment.

FIG. 8 shows another embodiment of the arrangement intended for the consumer market. The arrangement is an extension to that shown in FIG. 6 and, if an audio signal applied to the input terminals is not provided with a copy inhibit code in the form of the two auxiliary signals, it enables these two auxiliary signals to be added as yet before the audio signal is recorded on the record carrier.

For this purpose the arrangement comprises components as already described with reference to FIG. 1. The arrangement shown in FIG. 8, for example, comprises the filter devices 11 and 12, the signal-combination units 8, 9 and 10 and the signal-processing units 5 and 6. In addition, it comprises switches $S'_3$ and $S'_4$, which are coupled to the outputs 13 and 14 of the combination units 9 and 10 and switches $S_5$ and $S_6$. The switches $S_3$ and $S'_3$ are coupled to the terminals a and b respectively of the switch $S_5$. The terminal c of the switch $S_5$ is coupled to the input 15 of the recording unit 17. The switches $S_4$ and $S'_4$ are coupled to the terminals a and b respectively of a switch $S_6$. The terminal c of the switch $S_6$ is coupled to the input 16 of the recording unit 17'.

In the present case the recording unit 17 is of a different construction, i.e. it is a recording unit for an SDAT recorder by means of which the audio information is recorded on the record carrier with the aid of a plurality of stationary recording heads 65.1 to 65.n in n parallel adjacent tracks which extend in the longitudinal direction of this record carrier. For a further explanation reference is made to the book by Watkinson.

The filter units 3 and 4 act both to detect the auxiliary signals and to extract the low-frequency signal components, so that the auxiliary signals in the signal-processing units 5 and 6 can be added to the low-frequency signal components which have been added in the combination unit 8. Moreover, the control signal generated by the detection unit 64 is applied not only to the switches $S_3$ and $S_4$ via the line 67 but also to be switches $S'_3$ and $S'_4$. Upon detection of the auxiliary signals in the incoming audio signal the detection unit 64 thus applies a control signal to the switches $S_3$, $S'_3$, $S_4$ and $S'_4$, so that these switches are set to an open position. Consequently, it is no longer possible to record the audio signal. In the absence of the auxiliary signals is the incoming audio signal no control signal is applied to the switches $S_3$, $S'_3$, $S_4$ and $S'_4$, so that these switches are closed.

It is now possible to record the incoming audio signal directly on the record carrier. For this purpose, the switches $S_5$ and $S_6$ are set to such a position that the terminals a and c of the two switches are interconnected under the influence of the control signal applied via the terminals 75.

Another possibility is to add the two auxiliary signals to the audio signal prior to recording on the record carrier, in order to protect a recording thus made against subsequent unauthorized copying. Under the influence of another control signal applied to the terminal 75 the switches S₅ and S₆ are then set to the position other than that shown in FIG. 8 and the audio signal containing the copy-protection code can be recorded on the record carrier.

Another possibility may be to exclude the choice whether or not to add a copy-protection code an audio signal which is not protected against copying. This means that if the detection unit 64 detects the absence of the auxiliary signal the auxiliary signals are added automatically before the audio is recorded. This can be achieved by means of the arrangement shown in FIG. 8, which is then modified as follows.

The connections from the input terminals 1 and 2 to the inputs 15 and 16 respectively of the recording unit 17', including the switches S₃, S₄, S₅ and S₆, are then dispensed with. Direct interconnections are now provided from the outputs of the switches S'₃ and S'₄ to the input 15 and 16 respectively of the recording unit 17'. If the detection unit 64 detects an auxiliary signal the switches S'₃ and S'₄ are open. If the absence of the auxiliary signals is detected the switches S'₃ and S'₄ are closed and the audio signal, to which the auxiliary signals have been added, is recorded.

Such a device is very useful if it is decided to allow only copies to be made of prerecorded record carreirs (which are then not provided with said auxiliary signals) and original recordings (which are neither provied with said auxiliary signals), but not to allow these copies to be copied.

A prerecorded record carrier can now be copied normally. However, the resulting copy is now provided with the auxiliary signals and cannot be copied again.

In the foregoing it is assumed that if an auxiliary signal is detected recording should be inhibited or the audio signal should be distorted seriously prior to being recorded.

Figure 9:
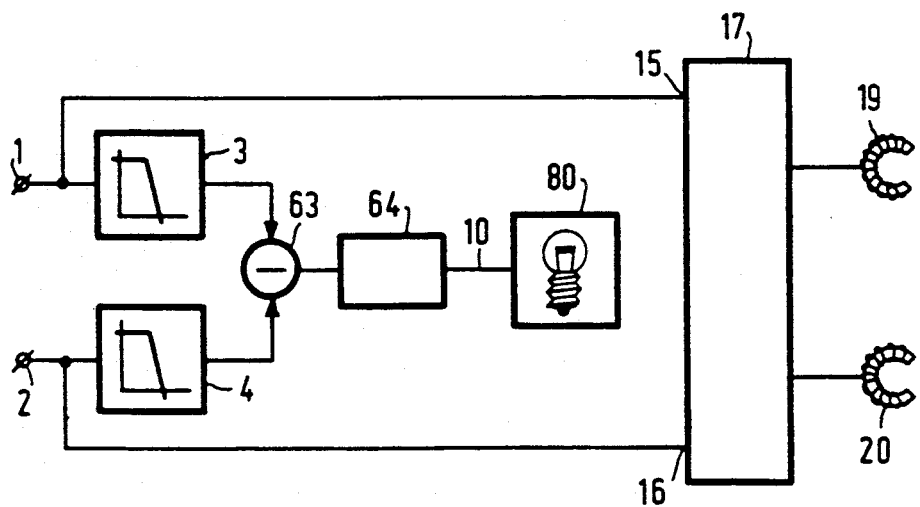
FIG. 9 shows still another embodiment.

It desired, another philosophy may be adopted. The view may be taken that it should remain possible for an audio signal provided with a copy-protection code to be recorded. In that case it is merely required to provide an indication that the signal to be recorded contains such a code. An embodiment of such an arrangement is shown in FIG. 9. The arrangement bears much resemblance to the arrangement shown in FIG. 6. The switches S₃ and S₄ are now replaced by interconnections. Furthermore, the output of the detection unit 64 is coupled to a signalling unit 80, for example in the form of a light-emitting diode. The auxiliary signals in the audio signal now function as a signalling code, to signal the fact that the audio signal to be copied should in fact not be copied, rather than as a copy-protection code.

The decision whether the audio signal is subsequently copied is now then taken by the user himself. If the presence of an auxiliary signal in the audio signal to be recorded is detected, the detection unit will generate a control signal which is applied to the signalling unit 80. The lamp (light-emitting diode) light up. The user may now decide to discontinue recording.

Figure 10:
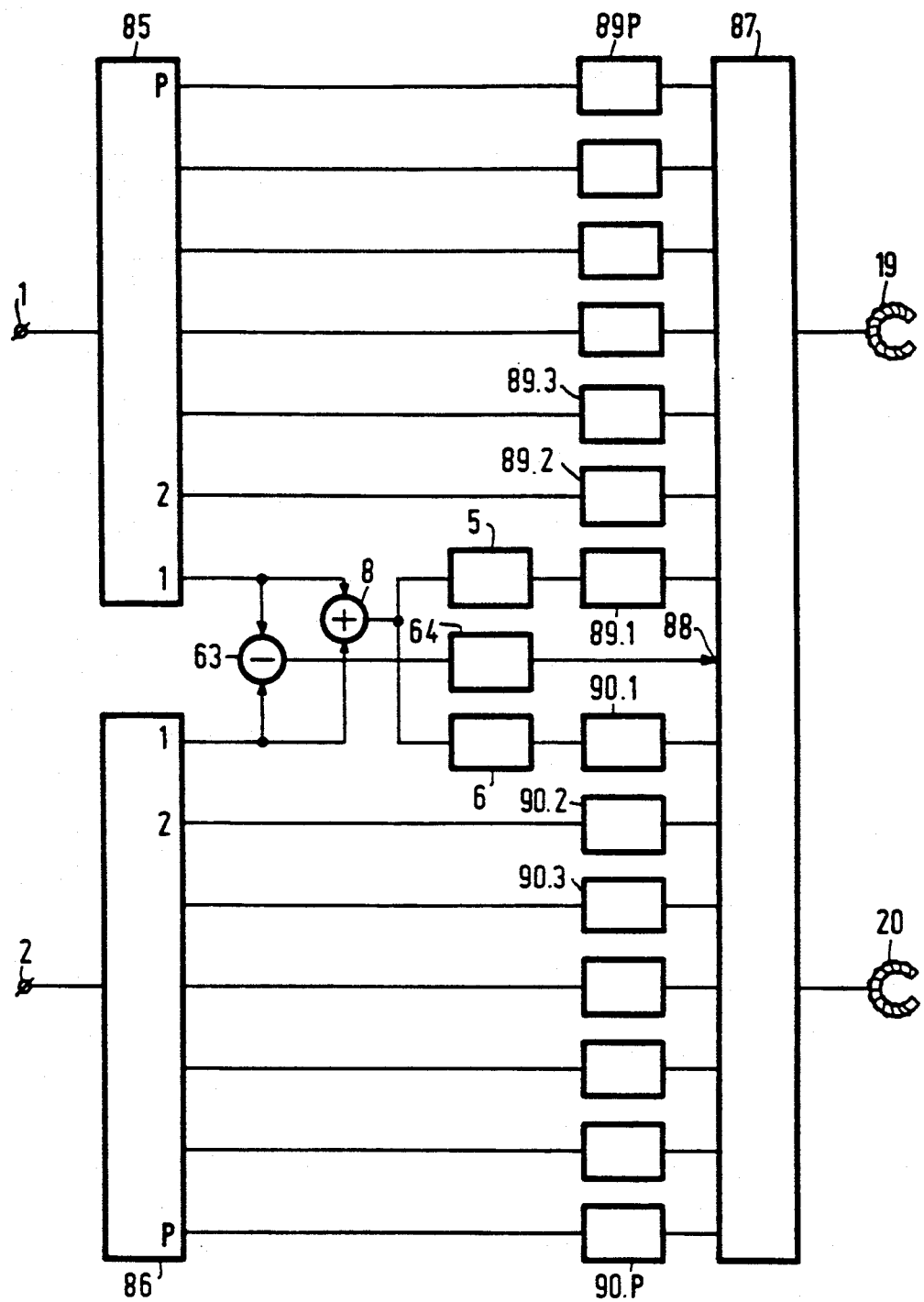
FIG. 10 shows yet another embodiment of the arrangement.

FIG. 10 shows an embodiment in which the invention is applied to a system comprising an encoder for subband coding of the audio signal, as is described in, for exampole, the above-referenced European Patent Application 289,080. In the relevant case the frequency range in which the audio signal is situated is divided into a plurality of adjacent subbands. The width of the subbands increases towards higher frequencies. However, this is not necessary. It is alternatively possible using analysis-filter means intended for this purpose to divide the overall bandwidth into subbands of equal bandwidth.

In FIG. 10 the analysis-filter means bear the reference numerals 85 and 86 respectively, to which the left-hand and the right-hand channels of the stereo audio signal are applied via the terminals 1 and 2 respectively. The analysis-filter means divide the left-hand and the right-hand channel into P subband signals, which are applied to the outputs 1 to P of the means 85 and 86 respectively. The output signal of the lowest subband is available on the outputs 1 of the filter means 85 and 86. These output signals are combined in the signal-combination units 8 and 63 in a manner as described with reference to FIG. 8. By means of the detection unit 64 it is possible to detect whether the auxiliary signals are present in the signal applied to the terminals 1 and 2. The generated control signal is applied to the control-signal input 88 of the recording unit 87 and ensures that recording is inhibited or the signal to be recorded is seriously distorted.

By means of the signal-processing units 5 and 6 it is again possible to add to auxiliary signals to the audio signal applied to the input terminals 1 and 2 in the absence of the auxiliary signals in this audio signal.

The output signals of subbands situated in frequency ranges of increasing frequency are available on the outputs of correspondingly higher sequence number of the analysis-filter means. The outputs of the signal-processing units 5 and 6 coupled to inputs of quantisers 89.1 and 90.1 respectively. The outputs of the analysis-filter means 85 nd 86 having sequence numbers 2, 3, . . . P are coupled to the inputs of quantisers 89.2 and 89.3, . . . 89.P and 90.2, 90.3, . . . 90.P respectively. If desired, the quantisers may be constructed as adaptive quantisers. For the use of adaptive quantisers in encoders for subband coding reference is made, for example, to the Applicant's Netherlands Patent Application 88.02.769.

By means of an encoder for subband coding the bit rate of the data stream of be recorded can be reduced. After quantisation in the quantisers 89.1 to 89.P and 90.1 to 90.P the signals are applied to the recording unit 87. In the recording unit 87 the signals are processed in a manner which is not described in further detail, in such a way that they can be recorded by means of the recording heads 19 and 20.

It is to be noted that all the embodiments described herein relate to arrangements for recording a (stereo) audio signal on a magnetic record carrier. However, the scope of the invention is not limited thereto. The invention applies also to those devices which record the audio signal on an optical record carrier. With the advent of CD erasable, CD write-once and magneto-optical recording technologies this possibility will come within reach of the consumer in the future.

What is claimed is:

1. Apparatus for recording on a record carrier an audio signal comprising a left-hand and a right-hand channel, which apparatus has a first and a second input terminal for receiving the left-hand and the right-hand channel respectively, said first and said second input terminal being coupled respectively to a first and a second input respectively of the recording unit to record the signals applied to its inputs on the record carrier; characterized in that:

the first and the second input terminal are coupled to an input of a first and a second filter respectively, which filters are adapted to extract a first and a second low-frequency signal component from the left-hand and the right-hand channel respectively and to apply the first and the second low-frequency signal component to an output;

the output of the first filter is coupled to an input of a first signal-processing unit and the output of the second filter is coupled to an input of the second signal-processing unit;

the outputs of the first and the second signal-processing unit are coupled to the first input and the second input respetively of the recording unit;

the first signal-processing unit is adapted to add a first auxiliary signal to the signal applied to its input and to supply the signal thus processed to its output, and the second signal-processing unit is adapted to add a second auxiliary signal to the signal applied to its input and to supply the signal thus processed to its output; and the first and second auxiliary signals being such that during reproduction of the audio signal, including the first and the second auxiliary signal added thereto, via two loudspeaker units arranged in a stereo configuration, the auxiliary signals are substantially inaudible to a listener.

2. Apparatus for recording on a record carrier an audio signal comprising a left-hand and a right-hand channel, which apparatus has a first and a second input terminal for receiving the left-hand and the right-hand channel respectively, said first and said second input terminal being coupled respectively to a first and a second input of a recording unit to record the signals applied to its inputs on the record carrier, characterized in that:

the first and the second input terminal are coupled to an input of a first and a second filter respectively, the first and the second filter being adapted to extract a first and a second low frequency signal component respectively from the left-hand and the right-hand channel respectively and to supply the first and the second low-frequency signal component to an output;

the output of at least one of the two filters is coupled to an input of a detector unit adapted to detect the presence of an auxiliary signal in the low-frequency signal component of at least one of the two signal channels and to generate a control signal upon detection of the auxiliary signal and supply the control signal to an output; and the output of the detector unit is coupled to a control-signal input of the recording unit, the recording unit being adapted to inhibit recording in the presence of the control signal and to record the audio signal in the absence of the control signal.

3. Apparatus for recording on a record carrier an audio signal comprising a left-hand and a right-hand channel, which apparatus has a first and a second input terminal for receiving the left-hand and the right hand channel respectively, said first and said second input terminal being coupled respectively to a first and a second input of a recording unit to record the signals applied to its inputs on the record carrier, characterized in that:

the first and the second input terminal are coupled to an input of a first and a second filter respectively, the first and the second filter filters being adapted to extract a first and a second low-frequency signal component from the left-hand and the right-hand channel respectively and to supply the first and the second low-frequency signal component to an output;

the output of at least one of the two filters is coupled to an input of a detector unit adapted to detect the presence of an auxiliary signal in the low-frequency signal component of at least one of the two channels and to generate a control signal upon detection of the auxiliary signal,, and to supply the control signal to an output; and the output of the detector unit is coupled to a signalling unit which is adapted to indicate that in the presence of the control signal the audio signal to be recorded is an audio signal which includes the auxiliary signal.

4. Apparatus as claimed in claim 2, further characterized in that:

the output of the first filter is coupled to an input of a first signal-processing unit and the output of the second filter is coupled to an input of a second signal-processing unit, the outputs of the first and the second signal-processing unit being respectively coupled to the first and the second input of the recording unit, the first signal-processing unit being adapted to add a first auxiliary signal to the signal applied to its input and to supply the signal thus processed to its output, and the second signal-processing unit being adapted to add a second auxiliary signal to the signal applied to its input and to supply the signal thus processeed to its output;

the apparatus is adapted to optionally add in the absence of the control signal the first and the second auxiliary signal to the audio signal applied to its input terminals and to supply the audio signal, thus processed or not, to the inputs of the recording unit;

the first and the second auxiliary signal being such that during reproduction of the audio signal, including the first and the second auxiliary signal added thereto, via two loudspeaker units arranged in a stereo configuration, said auxiliary signals are substantially inaudible to a listener.

5. Apparatus as claimed in claim 2, further characterized in that:

the output of the first filter is coupled to an input of a first signal processing unit, the output of the second filter device is coupled to an input of a second signal processing unit, and the outputs of the first and the second signal processing unit are coupled to the first and the second input of the recording unit;

the first signal-processing unit is adapted to add a first auxiliary signal to the signal applied to its input and to supply the signal thus processed to its output, and the second signal-processing unit is adapted to add a second auxiliary signal to the signal applied to its input and to supply the signal thus processed to its output;

the apparatus is adapted to add, in the absence of the control signal, the first and the second auxiliary signal to the audio signal applied to its input terminals and to supply the audio signal thus processed to the inputs of the recording unit;

the first and the second auxiliary signal being such that during reproduction of the audio signal, including the first and the second auxiliary signal added thereto, via two loudspeaker units arranged in a stereo configuration, said auxiliary signals are substantially inaudible to a listener.

6. Apparatus as claimed in claim 1, characterized in that the signal-processing units are adapted to determine the amplitude of the input signals applied to their inputs and are adapted to add auxiliary signals to said input signals in such a way that in the case of an increasing or decreasing amplitude of an input signal the amplitude of the auxiliary signal to be added also increases or decreases respectively.

7. Apparatus as claimed in claim 1, characterized in that the outputs of the first and the second filter are coupled to a first and a second input of a signal combination unit which has an output coupled to the inputs of the two signal processing units.

8. Apparatus as claimed in claim 1, characterized in that: the first signal-processing unit is adapted to amplify the signal applied to its input, in cycles of two successive time intervals $T_1$ and $T_2$, by values substantially equal to $1+a$ and $1-a$ respectively; and the second signal processing unit is adapted to amplify the signal applied to its input, in cycles in similar time intervals $T_1$ and $T_2$, by values substantially equal to $1-a$ and $1+a$ respectively; a being a constant smaller than 1.

9. Apparatus as claimed in claim 1, characterized in that the first signal-processing unit is adapted to shift the phase substantially equal to the signal applied to its input by a value of $a°$ and the second signal-processing unit is adapted to shift the phase of the signal applied to its input by a value substantially equal to $-a°$.

10. Apparatus as claimed in claim 1, characterized in that the signal processing units are adapted to add and subsequently not to add the auxiliary signal to the signals applied to their outputs in cycles of two successive time interavals $T_A$ and $T_B$.

11. Apparatus as claimed in claim 1, further characterized in that: the first input terminal is further coupled to a third filter and the second input terminal is coupled to a fourth filter, the third and the fourth filters being adapted to extract a second higher-frequency signal component from the left-hand and the right-hand channel respectively; and an output of the third and the fourth filter is coupled respectively to a third and a fourth input of the recording unit to record the signal components of higher frequency of the left-hand and the right-hand channel on the record carrier.

12. Apparatus as claimed in claim 11, further comprising an encoder for subband coding of a digital audio signal of a given sampling rate 1/T, characterized in that:

the first and the third filter are coupled to first analysis-filter means and the second and the fourth filter are coupled to second analysis-filter means which are responsive to the left-hand and the right-hand channel respectively to generate a plurality P of subband signals;

the analysis-filter means being adapted to divide the audio signal band of each of the signal channels with sampling-rate reduction into successive subbands having band numbers p ($1 \leq p \leq p$ and $p \geq 2$), which band numbers increase as the frequency increases; and the P outputs of the first and the second analysis-filter means are coupled to associated inputs of the recording unit to record the P subband signals on the record carrier.

13. A record carrier on which an audio signal composed of a left-hand and a right-hand channel is recorded by means of an apparatus as claimed in claim 1, characterized in that a first auxiliary signal is added to a low-frequency signal component of the left-hand channel; a second auxiliary signal is added to a low-frequency signal component of the right-hand channel; and the first and the second auxiliary signal are such that during reproduction of the audio signal recorded on the second carrier, including the first and the second auxiliary signals added thereto, via two loudspeaker units arranged in a stereo configuration, said signals are substantially inaudible to a listener.

14. Apparatus as claimed in claim 3, further characterized in that:

the output of the first filter is coupled to an input of a first signal-processing unit and the output of the second filter is coupled to an input of a second signal-processing unit;

the output of the first and the second signal-processing unit are coupled to the first and the second input of the recording unit, the first signal-processing unit being adapted to add a first auxiliary signal to the signal applied to its input and to supply the signal thus processed to its output, and the second signal-processing unit being adapted to add a second auxiliary signal to the signal applied to its input and to supply the signal thus processed to its output;

the apparatus is adapted to optionally add in the absence of the control signal the first and the second auxiliary signal to the audio signal applied to its input terminals and to supply the audio signal, thus processed or not, to the inputs of the recording unit;

the first and the second auxiliary signal being such that during reproduction of the audio signal, including the first and the second auxiliary signal added thereto, via two loudspeaker units arranged in a stereo configuration, said auxiliary signals are substantially inaudible to a listener.

15. Apparatus as claimed in claim 14, further characterized in that the signal-processing units are adapted to determine the amplitude of the input signals applied to their inputs and to add auxiliary signals to said input signals in such a way that in the case of an increasing or decreasing amplitude of an input signal the amplitude of the auxiliary signal to be added also increases or decreases respectively.

16. Apparatus as claimed in claim 14, characterized in that the outputs of the first and the second filter device are respectively coupled to a first and a second input of a signal combination unit which has an output coupled to the inputs of the two signal processing units.

17. Apparatus as claimed in claim 14, further characterized in that: the first signal-processing unit is adapted to amplify the signal applied to its input, in cycles of two successive time intervals $T_1$ and $T_2$, by values substantially equal to $1+a$ and $1-a$ respectively; and the second signal processing unit is adapted to amplify the signal applied to its input, in cycles of similar time intervals $T_1$ and $T_2$, by values substantially equal to $1-a$ and $1+a$ respectively; a being a constant smaller than 1.

18. Apparatus as claimed in claim 14, further characterized in that the first signal-processing unit is adapted to shift the phase of the signal applied to its input by a value of $a°$ and the second signal-processing unit is adapted to shift the phase of the signal applied to its input by a value substantially equal to $-a°$.

19. Apparatus as claimed in claim 3, further characterized in that:

the output of the first filter is coupled to an input of a first signal processing unit and the output of the second filter is coupled to an input of a second signal processing unit, outputs of the first and the second signal processing unit being respectively coupled to the first and the second input of the recording unit;

the first signal-processing unit is adapted to add a first auxiliary signal to the signal applied to its input and to supply the signal thus processed to its output, and the second signal-processing unit is adapted to add a second auxiliary signal to the signal applied to its input and to supply the signal thus processed to its output;

the apparatus is adapted to add, the in absence of the control signal, the first and the second auxiliary signal to the audio signal applied to its input terminals and to supply the audio signal thus processed to the inputs of the recording unit; and the first and the second auxiliary signal are such that during reproduction of the audio signal, including the first and the second auxiliary signal added thereto, via two loudspeaker units arranged in a stero configuration, said auxiliary signals are substantially inaudible to a listener.

20. Apparatus as claimed in claim 19, characterized in that the signal-processing units to determine the amplitude of the input signals applied to their inputs and are adapted to add auxiliary signals to said input signals in such a way that in the case of an increasing or decreasing amplitude of an input signal the amplitude of the auxiliary signal to be added also increases or decreases respectively.

21. Apparatus as claimed in claim 19, characterized in that the outputs of the first and the second filter are respectively coupled to a first and a second input of a signal combination unit which has an output coupled to the inputs of the two signal processing units.

22. Apparatus as claimed in claim 19, characterized in that: the first signal-processing unit is adapted to amplify the signal applied to its input, in cycles of two successive time intervals $T_1$ and $T_2$, by values substantially equal to $1+a$ and $1-a$ respectively; and the second signal processing unit is adapted to amplify the signal applied to its input, in cycles of similar time intervals $T_1$ and $T_2$, by values substantially equal to $1-a$ and $1+a$ respectively; a being a constant smaller than 1.

23. Apparatus as claimed in claim 19, characterized in that the first signal-processing unit is adapted to shift the phase of the signal applied to its input by a value of $\alpha°$ and the second signal-processing unit is adapted to shift the phase of the signal applied to its input by a value substantially equal to $-\alpha°$.

* * * * *